(12) United States Patent
Drumwright et al.

(10) Patent No.: US 11,548,152 B2
(45) Date of Patent: Jan. 10, 2023

(54) SYSTEMS AND METHODS FOR ROBOTIC CONTROL UNDER CONTACT

(71) Applicant: DEXTROUS ROBOTICS, INC., Memphis, TN (US)

(72) Inventors: Evan Drumwright, Memphis, TN (US); Sam Zapolsky, Memphis, TN (US)

(73) Assignee: Dextrous Robotics, Inc., Memphis, TN (US)

(*) Notice: Subject to any disclaimer, the term of this patent is extended or adjusted under 35 U.S.C. 154(b) by 313 days.

(21) Appl. No.: 16/943,884

(22) Filed: Jul. 30, 2020

(65) Prior Publication Data
US 2021/0031375 A1 Feb. 4, 2021

Related U.S. Application Data

(60) Provisional application No. 62/882,396, filed on Aug. 2, 2019, provisional application No. 62/882,397, filed
(Continued)

(51) Int. Cl.
*B25J 9/16* (2006.01)
*B25J 13/08* (2006.01)
(Continued)

(52) U.S. Cl.
CPC ........ *B25J 9/1666* (2013.01); *B25J 9/0012* (2013.01); *B25J 9/161* (2013.01); *B25J 9/163* (2013.01);
(Continued)

(58) Field of Classification Search
CPC ...... B25J 9/1612; B25J 9/1661; B25J 9/1664; B25J 9/1666; B25J 9/1669; B25J 9/1679; G05B 2219/39536; G05B 2219/40053
See application file for complete search history.

(56) References Cited

U.S. PATENT DOCUMENTS

| 5,651,574 | A | 7/1997 | Tanikawa et al. |
| 8,276,959 | B2 | 10/2012 | Kim |

(Continued)

FOREIGN PATENT DOCUMENTS

| CN | 108858199 A | 11/2018 | |
| JP | 2010201538 A | * 9/2010 | ............ B25J 9/1612 |

(Continued)

OTHER PUBLICATIONS

International Search Report and Written Opinion for PCT/US2020/044297, dated Nov. 11, 2020, 11 pages.

*Primary Examiner* — Spencer D Patton
(74) *Attorney, Agent, or Firm* — Jeffrey Schox; Diana Lin

(57) ABSTRACT

A system comprises a database; at least one hardware processor coupled with the database; and one or more software modules that, when executed by the at least one hardware processor, receive at least one of sensory data from a robot and images from a camera, identify and build models of objects in an environment, wherein the model encompasses immutable properties of identified objects including mass and geometry, and wherein the geometry is assumed not to change, estimate the state including position, orientation, and velocity, of the identified objects, determine based on the state and model, potential configurations, or pre-grasp poses, for grasping the identified objects and return multiple grasping configurations per identified object, determine an object to be picked based on a quality metric, translate the pregrasp poses into behaviors that define motor forces and torques, communicate the motor forces and torques to the robot.

16 Claims, 3 Drawing Sheets

Related U.S. Application Data on Aug. 2, 2019, provisional application No. 62/882,395, filed on Aug. 2, 2019.

(51) Int. Cl.

| | | |
|---|---|---|
| *B25J 9/00* | (2006.01) | |
| *B25J 15/08* | (2006.01) | |
| *B65G 67/02* | (2006.01) | |
| *G05B 19/4155* | (2006.01) | |
| *B25J 15/00* | (2006.01) | |
| *B25J 15/02* | (2006.01) | |
| *B25J 9/04* | (2006.01) | |
| *B25J 9/12* | (2006.01) | |
| *B25J 9/02* | (2006.01) | |

(52) U.S. Cl.
CPC ........... *B25J 9/1612* (2013.01); *B25J 9/1633* (2013.01); *B25J 9/1653* (2013.01); *B25J 9/1664* (2013.01); *B25J 9/1669* (2013.01); *B25J 9/1676* (2013.01); *B25J 9/1694* (2013.01); *B25J 9/1697* (2013.01); *B25J 13/082* (2013.01); *B25J 13/085* (2013.01); *B25J 13/087* (2013.01); *B25J 13/088* (2013.01); *B25J 15/0038* (2013.01); *B25J 15/0233* (2013.01); *B25J 15/08* (2013.01); *B65G 67/02* (2013.01); *G05B 19/4155* (2013.01); *B25J 9/026* (2013.01); *B25J 9/046* (2013.01); *B25J 9/12* (2013.01); *G05B 2219/39536* (2013.01); *G05B 2219/50391* (2013.01)

(56) References Cited

U.S. PATENT DOCUMENTS

| | | |
|---|---|---|
| 9,283,676 B2 | 3/2016 | Shi et al. |
| 10,618,172 B1 | 4/2020 | Diankov et al. |
| 2004/0103740 A1 | 6/2004 | Townsend et al. |
| 2007/0073442 A1 | 3/2007 | Aghili |
| 2008/0247857 A1 | 10/2008 | Yuasa et al. |
| 2009/0158864 A1 | 6/2009 | Hayakawa et al. |
| 2010/0204713 A1 | 8/2010 | Ruiz |
| 2014/0156066 A1 | 6/2014 | Sakano |
| 2014/0265394 A1 | 9/2014 | Pergande et al. |
| 2014/0277742 A1 | 9/2014 | Wells et al. |
| 2015/0127150 A1 | 5/2015 | Ponulak et al. |
| 2016/0221187 A1 | 8/2016 | Bradski et al. |
| 2016/0243704 A1 | 8/2016 | Vakanski et al. |
| 2016/0327934 A1 | 11/2016 | Morimoto |
| 2017/0252922 A1 | 9/2017 | Levine et al. |
| 2017/0297198 A1 | 10/2017 | Lawrence et al. |
| 2019/0060019 A1 | 2/2019 | Maret |
| 2019/0061159 A1* | 2/2019 | Domae ................. B25J 9/1666 |
| 2019/0261566 A1 | 8/2019 | Robertson et al. |
| 2019/0308320 A1* | 10/2019 | Konishi ............... G06V 10/761 |
| 2019/0321974 A1 | 10/2019 | Leon et al. |
| 2020/0391385 A1 | 12/2020 | Oka et al. |
| 2021/0001481 A1* | 1/2021 | Hayashi ................ B25J 9/1664 |
| 2021/0178591 A1* | 6/2021 | Floyd-Jones .......... B25J 9/1666 |
| 2021/0369359 A1 | 12/2021 | Blanckaert et al. |
| 2022/0234200 A1* | 7/2022 | Narita .................... B25J 9/1633 |

FOREIGN PATENT DOCUMENTS

| | | |
|---|---|---|
| JP | 2018202541 A | 12/2018 |
| JP | 2018202641 A | 12/2018 |
| JP | 6458912 B1 | 1/2019 |
| WO | 2018087646 A1 | 5/2018 |

\* cited by examiner

SYSTEMS AND METHODS FOR ROBOTIC CONTROL UNDER CONTACT

CROSS-REFERENCE TO RELATED APPLICATIONS

This application claims priority under 35 U.S.C. 119(e) to U.S. Provisional Patent Application No. 62/882,395, filed Aug. 2, 2019, U.S. Provisional Patent Application No. 62/882,396, filed Aug. 2, 2019 and U.S. Provisional Patent Application No. 62/882,397, filed Aug. 2, 2019 the disclosures of which are hereby incorporated herein by reference in their entirety as if set forth in full.

This application is also related to U.S. patent application Ser. No. unassigned, filed on Jul. 30, 2020, entitled ROBOTIC MANIPULATORS, and is also related to U.S. patent application Ser. No. unassigned, filed on Jul. 30, 2020, entitled ROBOTIC SYSTEM FOR PICKING AND PLACING OBJECTS FROM AND INTO A CONSTRAINED SPACE, all of which are incorporated herein by reference in their entirety as if set forth in full.

BACKGROUND

Technical Field

The embodiments described herein are related to robotic control systems, and more specifically to a robotic software system for accurate control of robots that physically interact with various objects in their environments, while simultaneously incorporating the force feedback from these physical interactions into a "control policy".

Related Art

It is currently very hard to build automated machines for manipulating objects of various shapes, sizes, inertias, and materials. Within factories robots perform many kinds of manipulation on a daily basis. They lift massive objects, move with blurring speed, and repeat complex performances with unerring precision. Yet outside of these carefully controlled robot realms, even the most sophisticated robot would be unable to perform many tasks that involve contact with other objects. Everyday manipulation tasks would stump conventionally controlled robots. As such, outside of controlled environments, robots have only performed sophisticated manipulation tasks when operated by a human.

Within simulation, robots have performed sophisticated manipulation tasks such as grasping multifaceted objects, tying knots, carrying objects around complex obstacles, and extracting objects from piles of entangled objects. The control algorithms for these demonstrations often employ search algorithms to find satisfactory solutions, such as a path to a goal state, or a configuration of a gripper that maximizes a measure of grasp quality against an object.

For example, many virtual robots use algorithms for motion planning that rapidly search for paths through a state space that describes the kinematics and dynamics of the world. Almost all of these simulations ignore the robot's sensory systems and assume that the state of the world is known with certainty. As examples, they might be provided with greater accuracy of the objects' states, e.g., positions and velocities, than is obtainable using state-of-the-art sensors, they might be provided with states for objects that, due to occlusions, are not visible to sensors, or both.

In a carefully controlled environment, these assumptions can be met. For example, within a traditional factory setting, engineers can ensure that a robot knows the state of relevant objects in the world to accuracy sufficient to perform necessary tasks. The robot typically needs to perform a few tasks using a few known objects, and people are usually banned from the area while the robot is working. Mechanical feeders can enforce constraints on the pose of the objects to be manipulated. And in the event that a robot needs to sense the world, engineers can make the environment favorable to sensing by controlling factors such as the lighting and the placement of objects relative to the sensor. Moreover, since the objects and tasks are known in advance, perception can be specialized to the environment and task. Whether by automated planning or direct programming, robots perform exceptionally well in factories or other controlled environments. Within research labs, successful demonstrations of robots autonomously performing complicated manipulation tasks have relied on some combination of known objects, easily identified and tracked objects (e.g., a bright red ball), uncluttered environments, fiducial markers, or narrowly defined, task specific controllers.

Outside of controlled settings, however, robots have only performed sophisticated manipulation tasks when operated by a human. Through teleoperation, even highly complex humanoid robots have performed a variety of challenging everyday manipulation tasks, such as grasping everyday objects, using a power drill, throwing away trash, and retrieving a drink from a refrigerator.

But accurate control of robots that autonomously, physically interact with various objects in their environments has proved elusive.

SUMMARY

Systems and methods for controlling machines to accurately manipulate objects that can be effectively modeled by rigid body kinematics and dynamics are described herein.

A system comprises a database; at least one hardware processor coupled with the database; and one or more software modules that, when executed by the at least one hardware processor, receive at least one of sensory data from a robot and images from a camera, identify and build models of objects in an environment, wherein the model encompasses immutable properties of identified objects including mass and geometry, and wherein the geometry is assumed not to change, estimate the state including position, orientation, and velocity, of the identified objects, determine based on the state and model, potential configurations, or pre-grasp poses, for grasping the identified objects and return multiple grasping configurations per identified object, determine an object to be picked based on a quality metric, translate the pre-grasp poses into behaviors that define motor forces and torques, communicate the motor forces and torques to the robot in order to allow the robot to perform a complex behavior generated from the behaviors.

These and other features, aspects, and embodiments are described below in the section entitled "Detailed Description."

DETAILED DESCRIPTION

Figure 1:
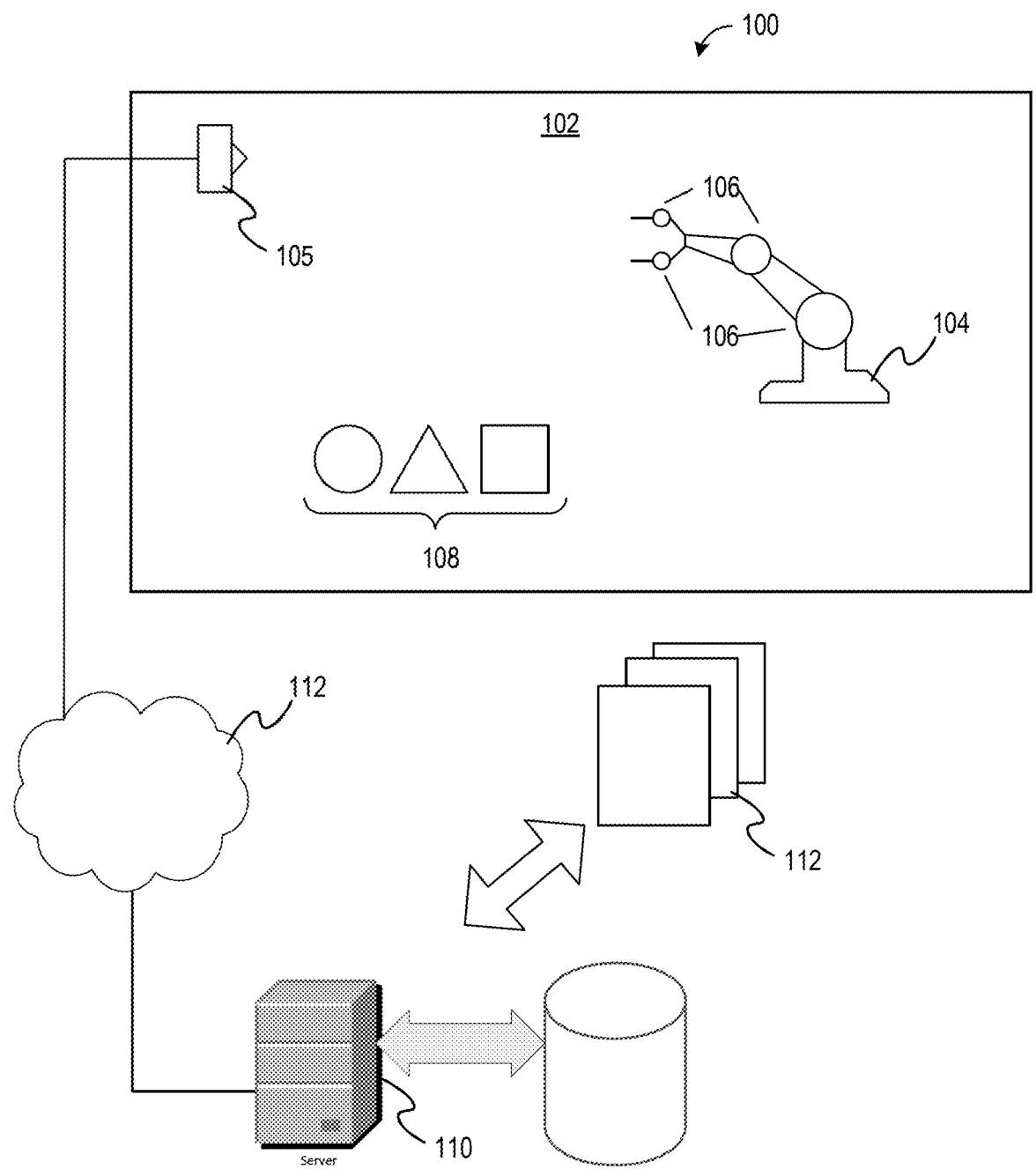
FIG. 1 is a diagram illustrating an example an environment in which a robot can be controlled in accordance with one embodiment.

Systems, methods, and non-transitory computer-readable media are disclosed for robot control. The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment can be employed with other embodiments, even if not explicitly stated herein. Descriptions of well-known components and processing techniques may be omitted so as to not unnecessarily obscure the embodiments of the disclosure. The examples used herein are intended merely to facilitate an understanding of ways in which the disclosure can be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Figure 3:
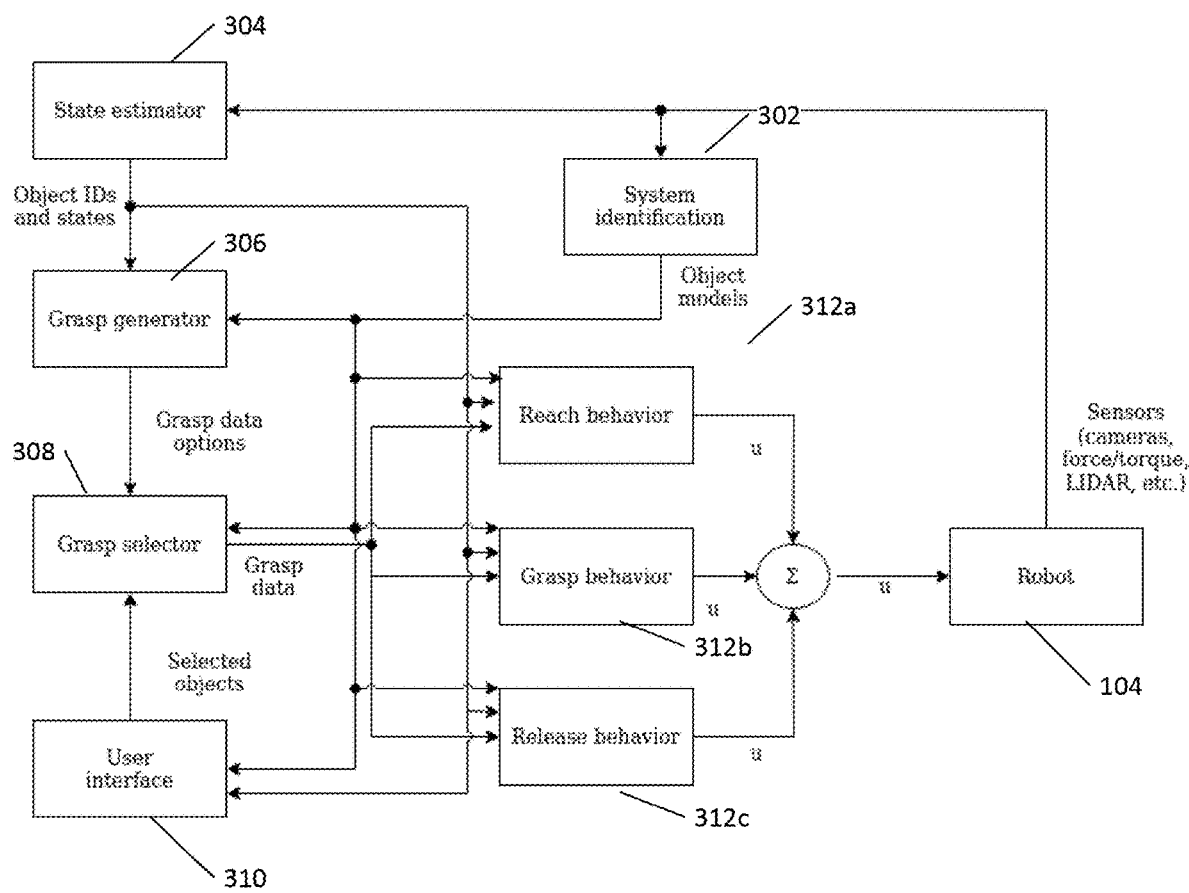
FIG. 3 is a diagram illustrating the software modules for controlling a robot within an environment such as depicted in FIG. 1, in accordance with one example embodiment.

FIG. 3 illustrates a process for controlling machines to accurately manipulate objects that can be modeled by rigid body kinematics and dynamics, e.g., bottles, silverware, chairs, etc., and the software modules configured to implement the process in accordance with one embodiment. Rigid body dynamics can be used to accurately model even non-stiff objects, like a rubber ball, due to the accuracy obtainable by a robot's sensors during real-time operation. With such software, robots can be made to, e.g., move furniture, pick up a pen, or use a wrench to tighten a bolt.

The highest-level construct of the software system can be termed a behavior. A behavior consists of a control policy that maps estimates of the state of the world to motor signals and, optionally, a deliberative component. For example, controlling a robot to reach toward an object, a "reach" behavior, in order to grasp it, requires planning a path through space such that the robot will not inadvertently collide with itself or its environment. After the plan has been computed, it can be input to an impedance controller, i.e., the control policy, sequentially until the planned motion is complete, which means either that the plan has been successfully executed or that execution failed. Various other kinds of control schemes will work as well, like admittance control, operational space control, etc.

Grasping is a key component of the system 300 illustrated in FIG. 3. Grasping is required before performing any other manipulation tasks, e.g., it is necessary to pick up the wrench to tighten the bolt. The grasping system, i.e., software and hardware configured to control the robot uses a database (120 in FIG. 1), the "grasp database", to determine how various objects should be grasped. For every possible object that the robot needs to grasp, the grasp database 120 provides the desired relative poses, or other proxies for this information such as key points for the robot 104 or manipuland between the manipuland, the object to be grasped, and each of the robot links that is to contact the manipuland, for the following stages of grasping: pre-grasp, the configuration prior to the grasp; grasping, the configuration during the grasp; and release, the configuration subsequent to releasing the manipuland.

The grasp database 120 informs the reach behavior as to how the robot should move toward the object in order to grasp it. Given a target manipuland as input, the reach behavior queries the grasp database 120 for the pregrasp configuration. The robot then plans a motion free of contact with the environment, excepting the manipuland, using any one of a number of motion planning algorithms, like RRT. It should be noted that the choice of algorithm will affect only the time it takes to find a solution. Once a contact-free path, represented as a set of points in the robot's configuration space, has been obtained, polynomial splines are fit to the points, yielding a trajectory, i.e., a time-dependent path. The reach behavior converts the trajectory in the robot's joint-space into operational or task space.

In certain embodiments, it is also be possible to use a learning approach to map a model or partial model, i.e., only the parts of the model that are observable, of the object's geometry and apparent surface properties, e.g., friction, to an appropriate way to grasp it, as opposed to or in addition to using the grasp database 120.

Behaviors can be executed sequentially, one immediately following the other; in parallel; or both. When executed in parallel, the outputs from all behaviors or motor signals are summed or combined. A state machine acts to switch between combinations of active behaviors, inactive behaviors output zero motor signals, at regular intervals, e.g., at 100 Hz, as a function of behaviors' conditions, which the programmer defines on an as-behavior basis.

As an example of the entire system in operation, a state machine for picking objects with the robot might consist of reaching and grasping behaviors. The state machine would be initialized to an idle state. After receiving a signal with a target object to pick from an operator, which could be human or a different software program, the state machine would transition to the reach node, activating the reach behavior. The reach behavior would generate a trajectory to pick the object, using the grasp database 120 described above, and then execute it. When the execution of the reach trajectory has completed, the state machine would transition to the pre-grasp state, activating the reach behavior. The reach behavior would generate a trajectory to pick the object, using the grasp database 120 described above, and then execute it. When the execution of the reach trajectory has completed, the state machine would transition to the grasp state, activating a grasp behavior and deactivating the reach behavior.

The grasp behavior uses a fixed control policy and the grasp database 120 to move the hand or gripper from the pre-grasp configuration to the grasping configuration. When the grasp behavior has completed successfully, indicated by detecting sufficient contact forces at the hand/gripper and absence of slip between the robot and the manipuland, the state machine would transition to the transport state, activating the reach behavior, in addition to the grasp behavior that is already activated.

Given a target pose in 3D space, the reach behavior again generates and executes a trajectory to effect this goal, at which point the state machine will have successfully executed the pick action. While this sequence of executed behaviors represents a successful pick, the state machine provides contingent operations for when one of the behaviors fails to effect its goal due to, e.g., errors in estimating the state of the manipuland or environment or imprecision in controlling the robot. For example, if the object slips from the grasp while the final sequence of the pick is executing, the state machine transitions back to the pre-grasp state, beginning the sequence anew.

FIG. 3 is a diagram of example software modules that can be configured to effect the process described above. As noted with respect to FIG. 3, these modules can be implemented on, e.g., the processor system 550 illustrated in FIG. 1, in order to create a specialized robot control system that provides accurate control of robots that can now autonomously or semi-autonomously, physically interact with various objects in their environments.

Sensory data flows from the robot 104 to the system identification process 302, which builds and refines models of objects (108 in FIG. 1) in the environment (102 in FIG. 1), and to the state estimation process 304, which estimates the state, position, orientation, and velocity, of the identified objects 102. A "model" encompasses immutable properties of an object, like mass and geometry. Since the objects are typically stiff, geometries do not generally change, but the systems and methods described herein do not rely upon this assumption.

The outputs of these processes, i.e., object models and states, can then be fed into the other software modules, which consist of a grasp generator 306 that can determine potential configurations, or pre-grasp poses, for grasping the objects that have been identified in the environment. This process returns multiple grasping configurations, grasp data options, per identified object.

Since the grasp generator generates many potential grasps among the various identified objects, a mechanism is necessary to determine which object should be picked, when the object that should be picked is arbitrary, as is the case when, e.g., physically sorting a collection of objects. The grasp selector 308 can be configured to choose among the various grasp data options. A quality metric, e.g., which grasp requires the robot to move the least, can be computed for each option, and the grasp, and associated object, is which object should be picked is arbitrary, with the highest quality is selected. Alternatively, a human operator can select a target object from a user interface 310, and the highest quality grasp associated with that target will be used.

Given grasp data, and reach, grasp, and release behaviors 312a, 312b, and 312c interact to perform the pick and place task. The behavior outputs, labeled "u" in the diagram, represent motor forces/torques, and are summed together ("fused") and sent to the robot. Combinations of these behaviors permit complex behavior to emerge. For example, transporting as described above, emerges from the interactions between the grasp and reach behaviors: the grasp behavior maintains the grasp on the object while the reach behavior is responsible for moving the robot's end effector to a pose where the object will be placed.

The system can be applied to any robot for which inertial (dynamics), shape, and appearance models of the robot are available. The system's model can be built using a combination of CAD/CAE and system identification to determine best-fit parameters through physical experimentation. Dynamics studies the movement of systems of interconnected bodies under the action of external forces. The dynamics of a multi-body system are described by the laws of kinematics and by the application of Newton's second law (kinetics) or their derivative form Lagrangian mechanics. The solution of these equations of motion provides a description of the position, the motion and the acceleration of the individual components of the system and overall the system itself, as a function of time.

The model consists of the following information, at minimum: the object mass, inertia matrix, i.e., set of six non-negative values that predict how an object rotates as a function of torques applied to the object; center-of-mass location; "undeformed" geometry, i.e., the shape of the object when it is not subject to any forces from loading; material stiffness, dry friction coefficient(s); visual appearance through, e.g., a bidirectional reflectance distribution function; and, if the object is articulated, then location; type, e.g., universal, prismatic, hinge; and parameters, e.g., directional axis of any joints.

This information can be gathered from direct measurement, estimation, or both. As one example, a user can create a geometric description of the object manually using 3D modeling or computer-aided engineering software or automatically using a 3D scanner. The object mass, i.e., from weighing the object; density information, known from material composition, and a geometric model can be input to an existing algorithm, such as described in B. Mirtich. Fast and accurate computation of polyhedral mass properties. J. Graphics Tools, Vol. 1, 1996, which will return the center-of-mass and inertia matrix. As another example, the material stiffness can be estimated using ubiquitous tables, provided in engineering reference books, listing Young's Modulus for various materials.

FIG. 1 is a diagram illustrating an example environment 100 in which the systems and methods described herein can be implemented. As can be seen, the system can use at least one RGB-D (color+depth) camera 105 or similar sensor using electromagnetic radiation, e.g., LIDAR, to be aimed into the workspace 102 that the robot 104 will be operating in. The camera can be used for example to determine pose for various objects 108. Alternatively, poses can be determined or estimated using radio/electromagnetic wave triangulation, motion capture, etc.

In certain embodiments, every joint 106 of the robot 104 is instrumented with a position sensor (not shown), such as an optical encoder. Further, force/torque sensors (not shown), such as a 6-axis force/torque sensor, can be used to sense forces acting on the robot's links 104. The sensors can be placed inline between two rigid links affixed together. Alternatively, tactile skins over the surface of the robot's rigid links can be used to precisely localize pressures from contact arising between the robot and objects (or people) in the environment.

The camera(s) 105 and sensors 106 can be wired and/or wirelessly communicatively coupled to a back end server or servers, comprising one or more processors running software as described above and below, which in turn can be wired and/or wirelessly communicatively coupled with one or more processors included in robot 104. The server processors run various programs and algorithms 112 that identify objects 108 within the images workspace 102 that the system has been trained to identify. For example, a camera image may contain a corrugated box, a wrench, and a sealed can of vegetables, all of which can be identified and added to a model containing the objects in the camera's sightline and the robot's vicinity). Server(s) 110 can be local or remote from workspace 102. Alternatively, the one or more programs/algorithms can be included in robot 104 and can be run by the one or more processors included in robot 104.

The programs/algorithms 112 can include deep neural networks that do bounding box identification from camera 105 (RGB) images to identify and demarcate, with boxes that overlay every object that the system has been trained to manipulate and observe in a particular image. This software can also encompass software that is specialized at identifying certain objects, like corrugated cardboard boxes, using algorithms like edge detectors, and using multiple camera views (e.g., calibrated stereo cameras) in order to get the 3D position of points in the 2D camera image.

When objects are unique, e.g., a 12 oz can of Maxwell House coffee, the 2D bounding box from a single camera is sufficient to estimate the object's 3D pose. When objects instead belong to a class, e.g., corrugated cardboard box, such that object sizes can vary, multiple camera views, e.g., from a calibrated stereo camera setup, are needed to establish correspondences between points in the 2D camera images and points in 3D. State-of-the-art techniques for training these neural networks use domain randomization to allow objects to be recognized under various lighting conditions, backgrounds, and even object appearances. Function approximation, e.g., deep neural networks trained on synthetic images, or a combination of function approximation and state estimation algorithms, can be used to estimate objects' 3D poses, or to estimate the value of a different representation, like keypoints, that uniquely determines the location and orientation of essentially rigid objects from RGB-D data. For example, a Bayesian filter (like a "particle filter") can fuse the signals from force sensors with the pose estimates output from a neural network in order to track the object's state position and velocity.

Function approximation, e.g., deep neural networks trained on camera images, can be used to estimate a dynamic, e.g., inertia, friction, etc., and geometric (shape) model of all novel objects that are tracked by the system, e.g., using the bounding boxes. The coffee can example used above might not require this process, because it is reasonable to expect that every coffee can is identical to the limitations of the accuracy brought to bear on the problem, i.e., due to the accuracy provided by the sensors and required by the control system. By way of contrasting example, boxes will exhibit different surface friction depending on the material of the box, e.g., corrugated, plastic, etc., and the location on the box. For example, if there is a shipping label placed on part of the box, then this can affect surface friction. Similarly, a neural network can infer the geometry of the obscured part of a box from a single image showing part of the box.

If an object is articulated, a kinematic model of the object can be estimated as well. Examples include doors, cabinets, drawers, ratchets, steering wheels, bike pumps, etc. The ground and any other stationary parts of the environment are modeled as having infinite inertia, making them immobile. Function approximation, e.g., deep neural networks trained on pressure fields, can be used to estimate the 3D poses of objects that the robot is contacting and thereby possibly obscuring the RGB-D sensor normally used for this purpose.

Kinematic commands ("desireds") for the robot can be accepted for each object that the robot attempts to manipulate. The desireds can come from behaviors. A behavior can be either a fast-to-compute reactive policy, such as a look up table that maps, e.g., the joint estimated state of the robot and manipuland to a vector of motor commands, or can include deliberative components, or planners, e.g., a motion planner that determines paths for the robot that do not result in contact with the environment. In that case of a planner, the output will be a time-indexed trajectory that specifies position and derivatives for the robot and any objects that the robot wants to manipulate.

In turn, the planner can use high level specifications, e.g., put the box on the table, to compute the output trajectories. This process is where motion planning comes into play.

By inverting the dynamics model of the robot (from a=F/m to F=ma) and modeling contact interactions as mass-spring-damper systems, the forces necessary to apply to the robots actuators can be computed in order to produce forces on contacting objects, and thereby move both them and the robot as commanded.

If the force/torque data is available, then the sensed forces on the robot can be compared against the forces predicted by the dynamics model. If, after applying some filtering as necessary, the forces are largely different, the robot can halt its current activity and act to re-sense its environment, i.e., reconcile its understanding of the state of its surroundings with the data it is perceiving. For example, a grasped $1kg$ box might slip from the robot's end effectors' grasp while the robot is picking the object. At the time that the object slips from the robot's grasp, the robot's end effector would accelerate upward, since less force would be pulling the end effector downward, while the dynamics model, which assumes the object is still within the object's grasp, might predict that the end effector would remain at a constant vertical position. When the disparity between the actual end-effector acceleration and predicted end-effector acceleration becomes greater than the model's bounds of accuracy, it becomes clear that the estimated model state is direly incorrect. For a picking operation, we expect this mismatch to occur due to a small number of incidents: an object has been inadvertently dropped, multiple objects have been inadvertently grasped, e.g., the robot intended to grab one object but grabbed two, a human entered the workspace and was struck by the robot, or the robot inaccurately sensed the workspace, causing it to inadvertently collide with the environment, i.e., the robot failed to sense an object's existence or it improperly parameterized a sensed object, e.g., estimating a box was small when it was really large.

The behaviors in this system, as well as the controllers, the perception system, and the conditions for transitioning between states in the state machine all use robot and environment-specific numbers (parameters). For example, controllers use gains to determine how quickly errors should be corrected; stiff (large) gains correct errors quickly at the expense of possible damage to the robot or environment if the error is due to inadvertent contact between the robot and environment. All such open parameters, which are state-dependent, i.e., they generally should change dynamically in response to the conditions of the robot and environment, are optimally computed to maximize the robot's task performance by solving an optimal control problem. Since the optimal control problem generally requires too much computation to solve, even offline, approximations are computed instead. Approximations include using dynamic programming along with discretizing the state and action spaces and reinforcement learning algorithms, e.g., the policy gradient algorithm. Our system uses simulations, given the detailed physical models previously described, to perform these optimizations and compute performant parameters offline. Further optimization can be performed online: parameters can be adjusted based on actual task performance, measured using sensory data. Such transfer learning can even use performance of similar, but not identical, robots on similar, but not identical, tasks in order to adjust parameters.

Figure 2:
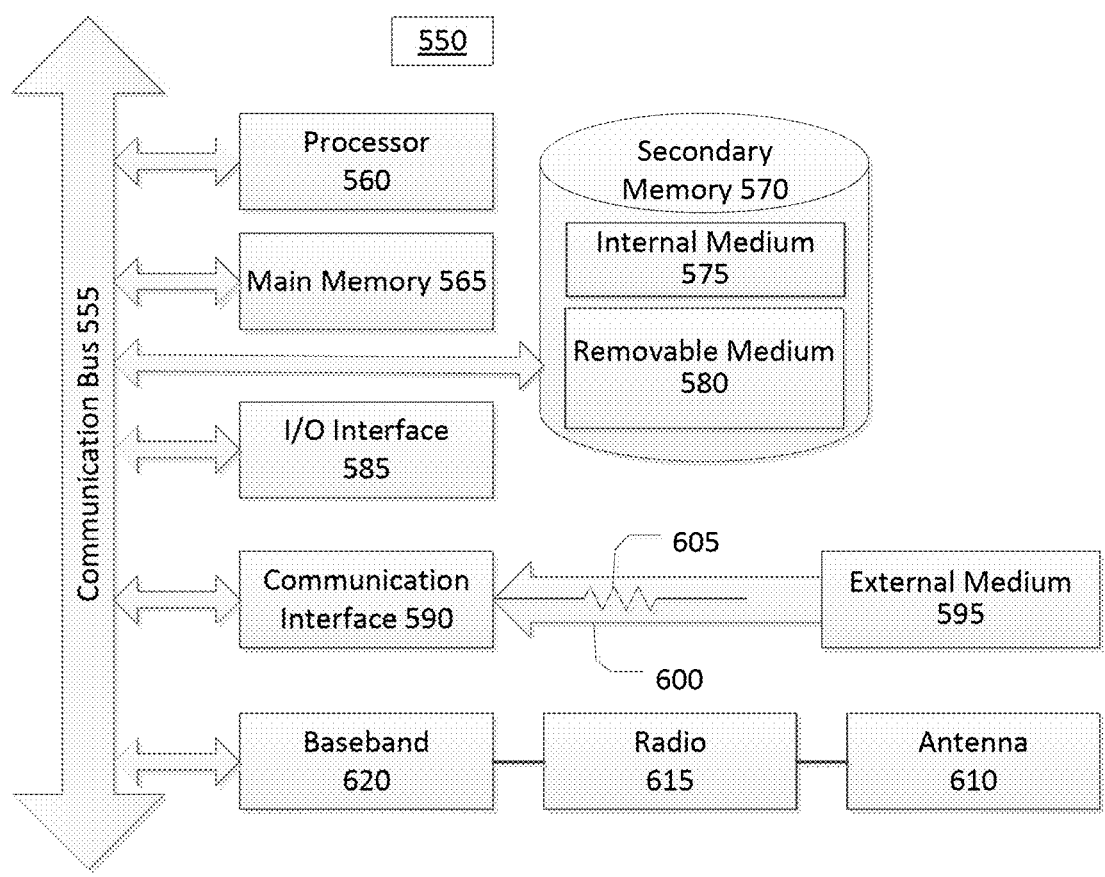
FIG. 2 is a diagram illustrating an example robot that can be used in the environment of FIG. 1 and controlled in accordance with one embodiment.

FIG. 2 is a block diagram illustrating an example wired or wireless system 550 that can be used in connection with various embodiments described herein. For example the system 550 can be used to implement the robot control system described above and can comprise part of the robot 104 or backend servers 110. The system 550 can be a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. System 550 can also include a tensor processing unit as well as motion planning processors or systems.

Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, Calif.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPM), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, Java, JavaScript, Pearl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 such as possibly robot 104, camera 105 or other sensors, as well as external devices (e.g. printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. The input device can also be the camera 105 or other sensors within environment 102 as well as robot 104. Examples of output devices include, without limitation, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615 and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission. The baseband system 620 can also be communicatively coupled with the processor 560.

Radio system 615 can for example be used to communicate with robot 104, camera 105, as well as other sensors.

The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed:

1. A system comprising:
a database;
at least one hardware processor coupled with the database; and
one or more software modules that, when executed by the at least one hardware processor,
receive at least one of sensory data from a robot and images from a camera,
identify and build models of objects in an environment, wherein the model encompasses immutable properties of identified objects including mass and geometry, and wherein the geometry is assumed not to change,
estimate the state including position, orientation, and velocity, of the identified objects,
determine, based on the state and model, pre-grasp poses for grasping the identified objects and return multiple grasping configurations per identified object,
determine an object to be picked based on a quality metric,
translate the pre-grasp poses into behaviors that define motor forces and torques, communicate the motor forces and torques to the robot in order to allow the robot to perform a complex behavior generated from the behaviors, wherein the behaviors include pre-grasp, grasp, transport and release, wherein the pre-grasp behavior includes a reach behavior that defines, based on the pre-grasp poses, how the robot should move toward the object in order to grasp it, wherein the reach behavior queries the database for the pre-grasp poses and plans a motion free of contact with the environment (a contact-free path), except the target object, represented as a set of points in a configuration space associated with the robot, and wherein once a contact-free path is obtained, fits splines to the points to determine a trajectory.

2. The system of claim 1, wherein the quality metric is based on which grasp requires the robot to move the least.

3. The system of claim 1, further comprising a user interface and wherein the one or more software modules, when executed by the at least one hardware processor further receives a target object selection via the user interface.

4. The system of claim 1, wherein the behaviors are executed sequentially, in parallel, or both.

5. The system of claim 4, wherein, when executed in parallel, the forces and torque associated with the behaviors are summed.

6. The system of claim 1, wherein the one or more software modules, when executed by the at least one hardware processor further determines when the grasp behavior has been completed by detecting, via the sensory data:
when sufficient contact forces between at least one hand/gripper associated with the robot have been applied, and
the absence of slip between the hand/gripper and the target object.

7. The system of claim 1, wherein the estimate of the state is based on function approximation.

8. The system of claim 1, wherein the identification of objects is based on bounding box identification.

9. A method comprising:
receiving at least one of sensory data from a robot and images from a camera,
identifying and building models of objects in an environment, wherein the model encompasses immutable properties of identified objects including mass and geometry, and wherein the geometry is assumed not to change,
estimating the state including position, orientation, and velocity, of the identified objects,
determining, based on the state and model, pre-grasp poses for grasping the identified objects and returning multiple grasping configurations per identified object,
determining an object to be picked based on a quality metric,
translating the pre-grasp poses into behaviors that define motor forces and torques,
communicating the motor forces and torques to the robot in order to allow the robot to perform a complex behavior generated from the behaviors, wherein the behaviors include pre-grasp, grasp, transport, and release, wherein the pre-grasp and transport behavior defines a reach behavior that defines, based on the pre-grasp poses, how the robot should move toward the object in order to grasp it, wherein the reach behavior queries a database for the pre-grasp poses and plans a motion free of contact with the environment (a contact-free path), except the target object, represented as a set of points in a configuration space associated with the robot, and wherein once a contact-free path is obtained, fits splines to the points to determine a trajectory.

10. The method of claim 9, wherein the quality metric is based on which grasp requires the robot to move the least.

11. The method of claim 9, further comprising receiving a target object selection via a user interface.

12. The method of claim 9, wherein the behaviors are executed sequentially, in parallel, or both.

13. The method of claim 12, wherein, when executed in parallel, the forces and torques associated with the behaviors are summed.

14. The method of claim 9, further comprising determining when the grasp behavior has been completed by detecting, via the sensory data:
- when sufficient contact forces between at least one hand/gripper associated with the robot have been applied, and
- the absence of slip between the hand/gripper and the target object.

15. The method of claim 9, wherein the estimate of the state is based on function approximation.

16. The method of claim 9, wherein the identification of objects is based on bounding box identification.

* * * * *